United States Patent [19]

Brown et al.

[11] 4,132,297

[45] Jan. 2, 1979

[54] AUTOMATIC FOUR-WHEEL DRIVE SYSTEM

[75] Inventors: Richard T. Brown; Robert W. Halberg; John P. Simmons; John W. Holdeman, all of Muncie, Ind.

[73] Assignee: Borg-Warner Corporation, Chicago, Ill.

[21] Appl. No.: 676,774

[22] Filed: Apr. 14, 1976

[51] Int. Cl.[2] .......................................... F16D 41/02
[52] U.S. Cl. .................................. 192/36; 74/665 G; 74/665 T; 180/49; 192/44; 192/48.3
[58] Field of Search ................... 180/49, 44 R, 76; 192/31, 32, 36, 38, 41 R, 41 S, 44, 45, 45.1, 47, 48.3, 48.92, 48.5, 46.6; 74/665 F, 665 G, 665 T, 665 GE, 721

[56] References Cited

U.S. PATENT DOCUMENTS

| | | | |
|---|---|---|---|
| 1,273,952 | 7/1918 | Tibbetts | 192/48.92 |
| 2,554,305 | 5/1951 | Luehrs | 192/45 |
| 2,699,852 | 1/1955 | Cost | 180/44 R X |
| 2,796,941 | 6/1957 | Hill | 188/44 R |
| 2,835,143 | 5/1958 | Kelbel | 180/49 X |
| 2,855,062 | 10/1958 | Arentzen | 180/76 X |
| 3,055,471 | 9/1962 | Warn | 192/38 X |
| 3,191,732 | 6/1965 | McDowall | 192/45.1 X |
| 3,221,574 | 12/1965 | Sampietro | 74/665 |
| 3,232,369 | 2/1966 | Holloway | 180/76 |
| 3,295,625 | 1/1967 | Ordorica | 180/44 R |
| 3,300,002 | 1/1967 | Roper | 192/35 |
| 3,481,436 | 2/1969 | Wilkowski | 192/35 |
| 3,854,561 | 12/1974 | Conde | 192/48.92 |

FOREIGN PATENT DOCUMENTS 899607 6/1945 France .................................. 180/44 R

*Primary Examiner*—John P. Silverstrim
*Attorney, Agent, or Firm*—Julian Schachner

[57] ABSTRACT

A power transfer mechanism incorporated in a multiple path drive system comprising a source of input torque, a transfer case, and a pair of drive axles having equal axle ratios. Torque is transferred directly to the first drive axle and, when required, is transferred automatically to the second drive axle through a path including a freewheel device. Another path is provided in parallel with the freewheel device for torque transfer from the second drive axle to the first drive axle.

4 Claims, 7 Drawing Figures

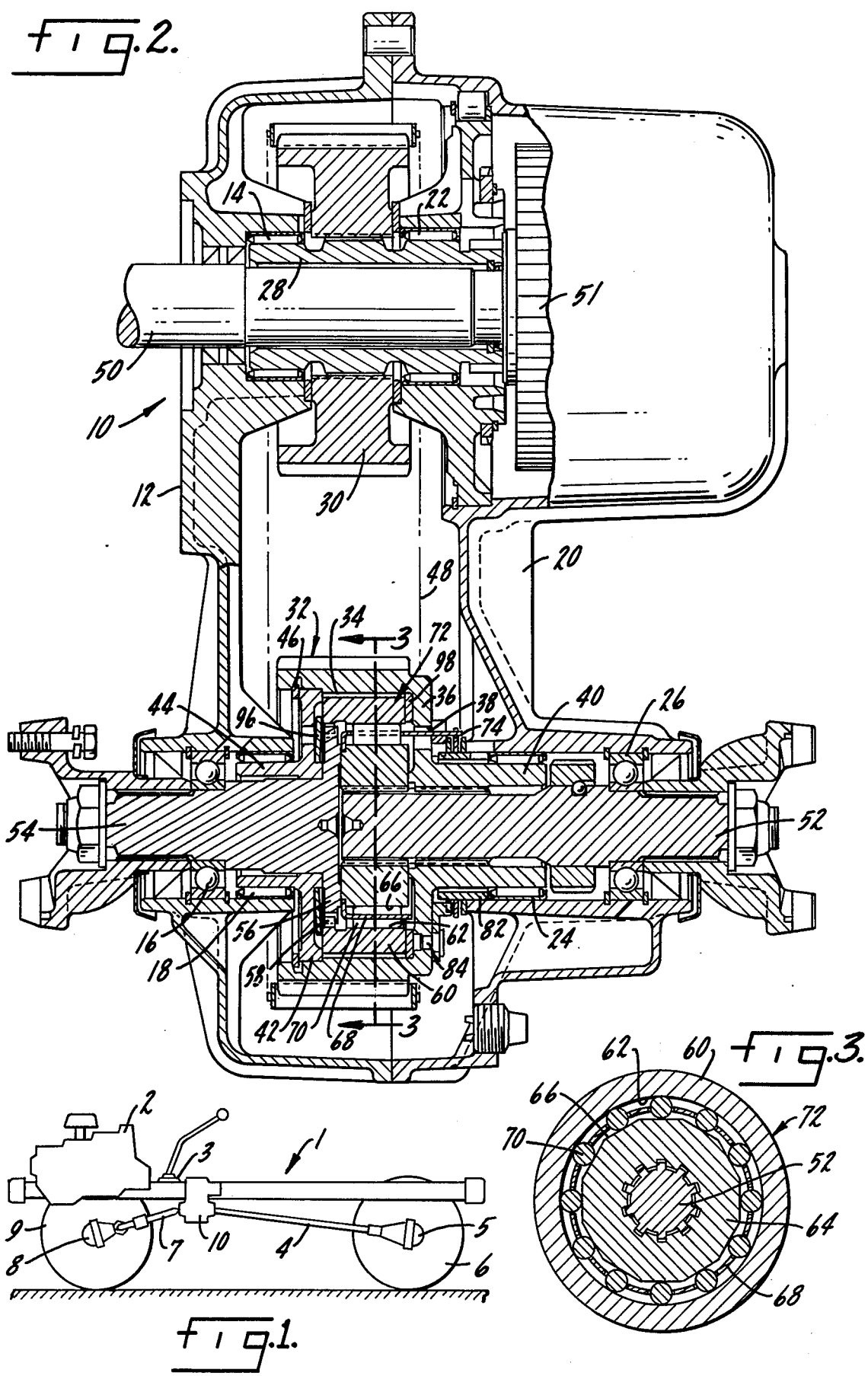
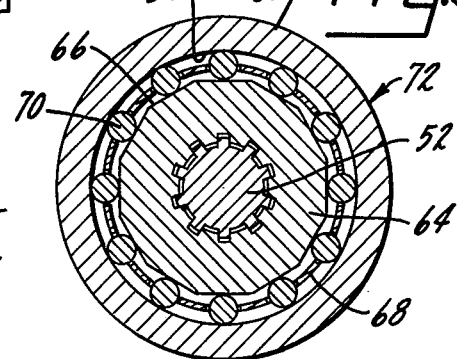

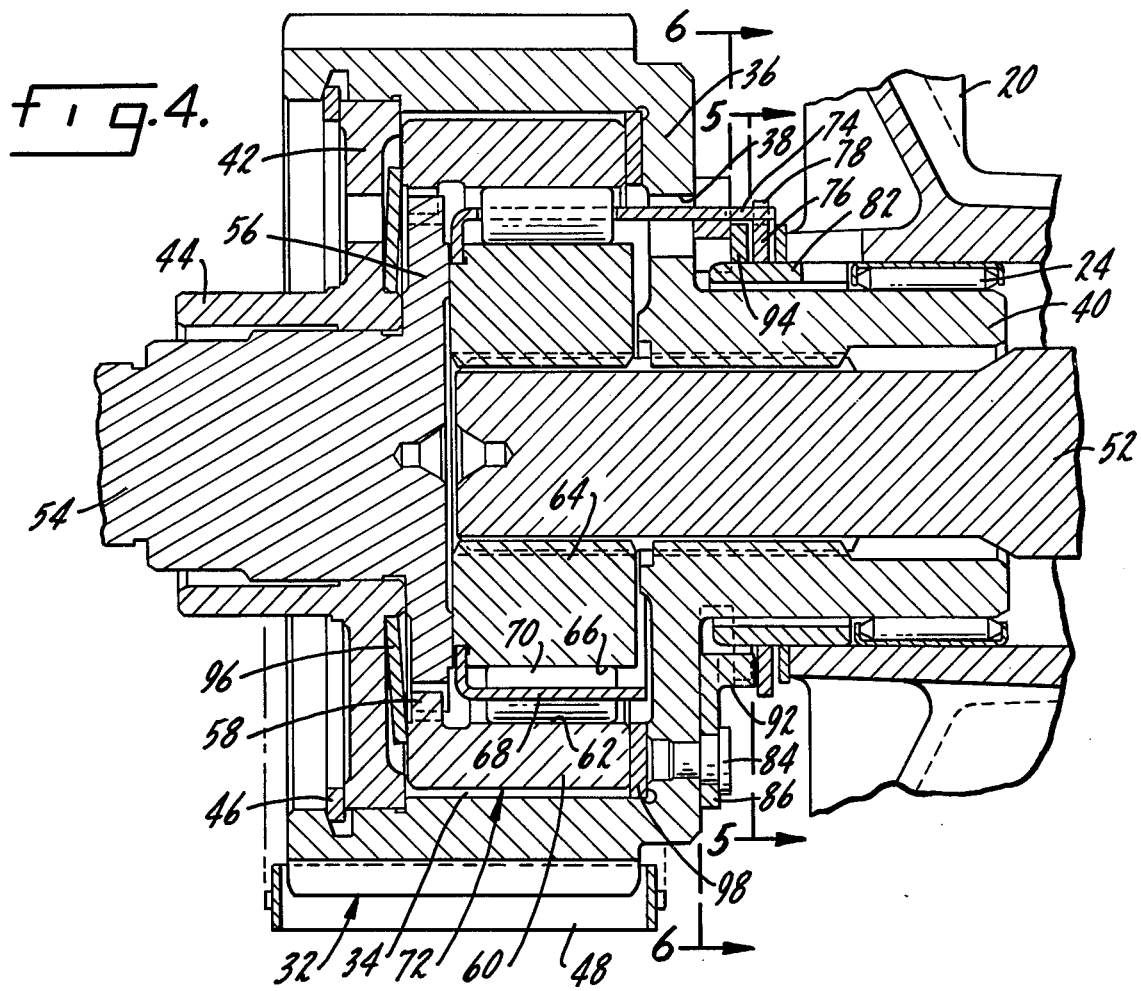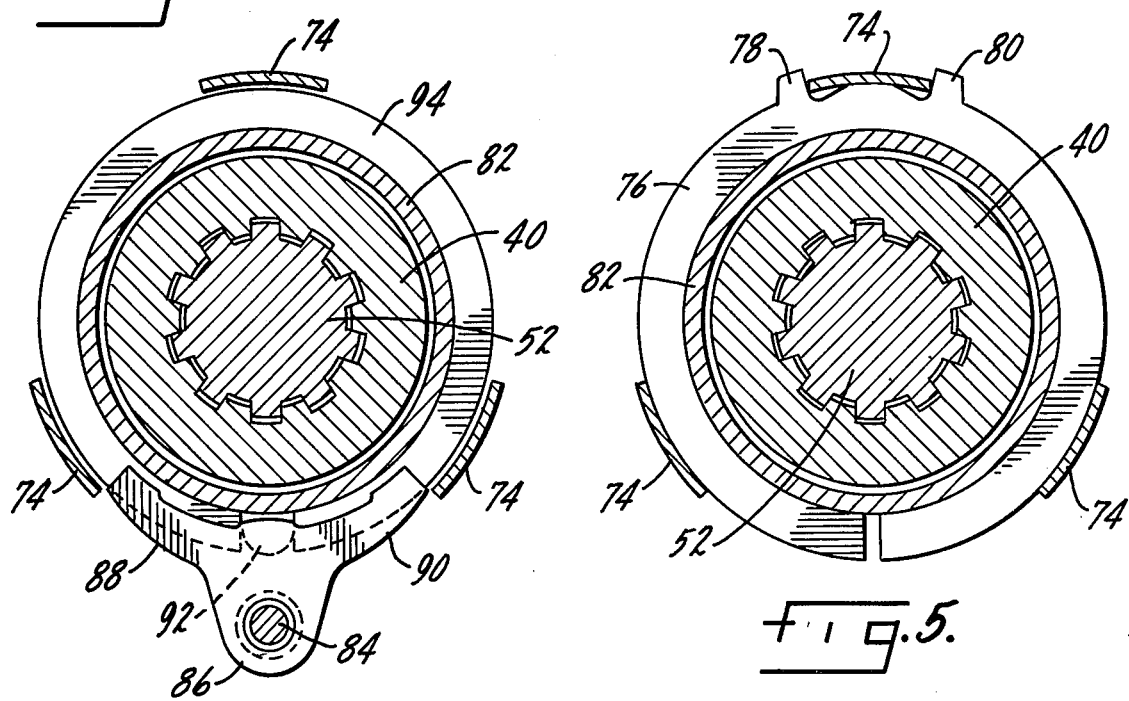

AUTOMATIC FOUR-WHEEL DRIVE SYSTEM

BACKGROUND OF THE INVENTION

In recent years, there have been many improvements in automotive drive trains, including improvements relating to the transfer of torque from a prime mover to drive axles. Where four-wheel drive systems are used, transfer cases have been developed which generally provide torque transfer to one output to drive an axle and to another output for driving another axle. Some such transfer cases generally have included a differential mechanism for allowing relative rotation between the outputs. Other such transfer cases have included a freewheel device which automatically engages and disengages the four-wheel drive function, as required.

In two-axle, four-wheel drive vehicles wherein the steering axle wheels are driven through a freewheel device, the known prior art requires that the steering axle wheels overrun the fixed axle wheels until the fixed axle wheels slip enough to equalize wheel speeds, at which time the steering axle wheels assume some of the driving effort. As disclosed herein, it has been found that the steering axle wheels need not overrun and indeed may underrun by a limited amount. One result is that equal axle ratios may be incorporated in the drive train to provide certain advantages in vehicle handling characteristics and operating efficiencies.

It has been found also that under certain operating conditions, existing systems exhibit undesirable characteristics. Specifically, when coasting on slippery surfaces or descending a hill on loose terrain using the engine as a brake, there is a tendency for the fixed axle wheels to skid, with consequent loss of vehicle direction control. As disclosed herein, this tendency may be corrected by providing sufficient drive back from the steering axle wheels to keep the fixed axle wheels rotating.

SUMMARY OF THE INVENTION

This invention is directed in brief to an improved four-wheel drive system including a transfer case of the type having an overrunning clutch therein. The transfer case is adaptable for transferring torque from an input directly to fixed axle wheels and through the overrunning clutch to steering axle wheels. The arrangement is such that the axles may have equal axle ratios. When the fixed (herein called the rear) axle wheels lose traction in either direction of rotation, the overrunning clutch effectively engages and torque is transferred to the steering (herein called the front) axle wheels so as to drive the front axle as well as the rear axle, thereby establishing a four-wheel drive condition. When traction is restored to the rear wheels, the overrunning clutch effectively disengages and the system reverts back to a two-wheel drive condition.

The transfer case includes a front output incorporating an outer clutch race of cylindrical configuration. A rear output incorporates an inner clutch race having a plurality of ramp surfaces, each associated with a roller carried by a roller cage. Frictional bias for the roller cage is provided by a drag ring rotatable with the roller cage and adapted for frictional engagement with the transfer case housing. When the vehicle's rear wheels lose traction, the overrunning clutch engages automatically.

Where a double-acting overrunning clutch is incorporated in the system, it is desirable to guard against undesirable engagement. A direction sensitive blocking device prevents undesirable roller movement through the freewheel position. The device is frictionally biased by a drag ring rotatable therewith and adapted for frictional engagement with the transfer case housing. Upon initial movement of the vehicle, a drag force is developed which causes an element of the device to pivot into the path of the roller cage. This prevents undesirable movement of the cage and its associated rollers across the central or freewheel position. The device is direction sensitive and operates in either direction of rotation, without regard to the speed of rotation.

The system may be used in conjunction with a vehicle having front and rear axles with equal axle ratios and still be operable with commercially available tires of the same size on both front and rear. As a result, the problems of engine breaking are minimized, handling characteristics are improved, and the ability of the vehicle to climb grades, especially on soft terrain, is improved.

A drive path is provided from the front axle to the rear axle independently of the overrunning clutch. The outer race element is in frictional engagement with the rear axle for transferring torque back from the front to the rear during the coast mode of operation. This establishes a drive path from the front wheels to the rear wheels in parallel with the overrunning clutch, but separate therefrom. As a result, sufficient power is transferred to the rear wheels to keep them rolling in coast when required to overcome the tendency of the rear wheels to skid.

Thus the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 1 is a schematic view of the four-wheel drive vehicle;

FIG. 2 is a sectional view showing the torque transfer case;

FIG. 3 is a sectional view taken along the line 3—3 of FIG. 2 showing details of the double-acting overrunning clutch;

FIG. 4 is an enlarged view of a portion of FIG. 2 showing details of the biasing and blocking devices, and also showing details of the drive-back mechanism;

FIG. 5 is an enlarged sectional view taken along the line 5—5 of FIG. 4 showing additional details of the biasing device;

FIG. 6 is an enlarged sectional view taken along the line 6—6 of FIG. 4 showing additional details of the blocking device.

Figure 7:
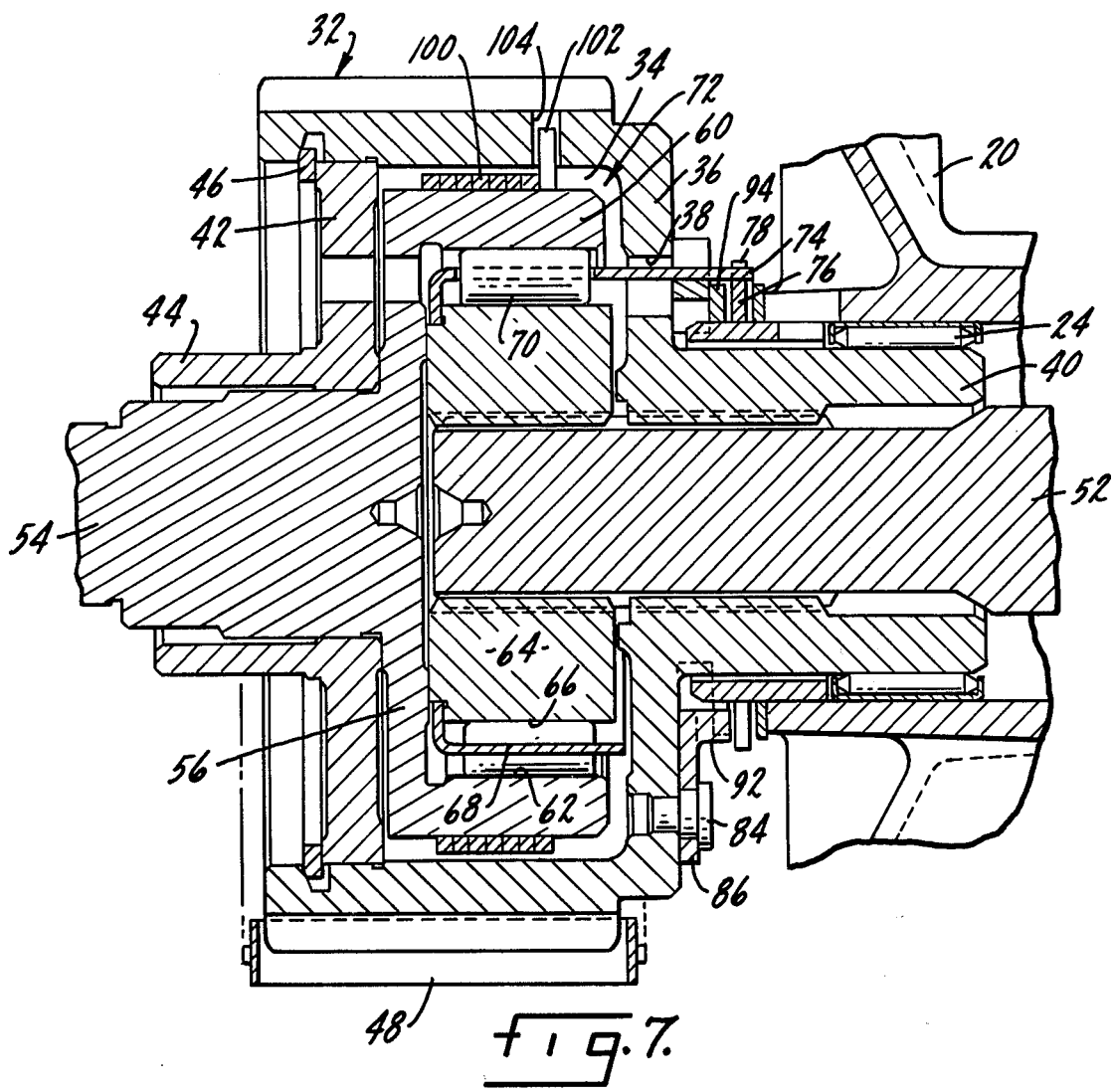
FIG. 7 is an enlarged view of a portion of FIG. 2 similar to FIG. 4 showing another form of the drive-back mechanism.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally in FIG. 1 a multiple path drive system in the form of a four-wheel drive vehicle 1 having a prime mover 2 in driving relationship with a suitable transmission 3. A propeller shaft 4 is in driving engagement with a fixed axle assembly 5, which in turn supports a pair of ground-engaging wheels 6. Another propeller shaft 7 is in driving engagement with a steerable axle assembly 8, which in turn supports a pair of ground-engaging wheels 9. Transfer case 10 is in engagement with transmission 3 for receiving torque from prime mover 2. Transfer case 10 also is in engagement with propeller shaft 4 for transmitting torque through fixed axle assembly 5 to drive wheels 6, and with propeller shaft 7 for transmitting torque through steerable axle assembly 8 to drive wheels 9.

As best shown in FIGS. 2 and 4, transfer case 10 includes a first housing section 12 which supports bearings 14, 16 and 18. Transfer case 10 also includes a second housing section 20 suitably secured to housing section 12. Bearings 22, 24 and 26 are supported by housing section 20.

A sleeve 28 is journalled in bearings 14 and 22. Splined to sleeve 28 is a first sprocket 30. A second sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly and axially from flange 36. Also forming a portion of sprocket 32 is a flange 42 having an annular extension 44 extending outwardly and axially therefrom. Flange 42 is secured to sprocket 32 by means of a locking ring 46 or the like. Sprocket assembly 32 is journalled in bearings 18 and 24. A suitable chain 48 couples sprockets 30 and 32. Sprocket 30, chain 48 and sprocket 32 form a chain drive train.

An input shaft 50 extends into transfer case 10. Input shaft 50 is adapted to receive torque, for example, from an associated manual or automatic transmission 3 of an automotive vehicle. It should be understood that input shaft 50 may be the output shaft of such a transmission. Input shaft 50 is in driving engagement with a suitable high-low range gear assembly 51, which in turn is in driving engagement with sleeve 28. One such assembly is the planetary gearset disclosed in U.S. application No. 621,194 filed Oct. 9, 1975.

A rear output or propeller shaft 52 is journalled in bearing 26 and extends into transfer case 10. Output shaft 52 is splined to extension 40 of sprocket 32. A front output or propeller shaft 54 is journalled in bearing 16. Output shaft 54 extends into transfer case 10 and defines an upstanding flange 56. A loose spline connection 58 engages flange 56 with an annular extension 60 within pocket 34 of sprocket 32. Extension 60 defines an outer clutch race 62 of cylindrical configuration.

An annular element or cam 64 is splined to output shaft 52 to provide relatively loose engagement therewith. This loose engagement is obtained by a clearance of up to several thousandths of an inch in the spline connection. Cam 64 is within pocket 34 and defines an inner clutch race 66 comprising a plurality of flats or ramp surfaces.

An annular cage 68 supports a plurality of wedging elements 70, one of which is associated with each flat of inner race 66. Extension 60, cam 64, races 62 and 66, cage 68 and wedging elements 70 comprise together a double-acting overrunning clutch 72. In one preferred form of the invention, wedging elements 70 are rollers, and clutch 72 is a roller clutch.

The relatively loose fit between cam 64 and output shaft 52 allows slight movement of cam 64, which is sufficient such that cam 64 is self-centering on rollers 70. This avoids eccentricity which could result in uneven loading, thus allowing for a more equitable distribution of the load transferred through clutch 72 and tending to balance the forces acting thereon.

As best shown in FIGS. 4 and 5, roller cage 68 defines a plurality of fingers 74 extending through openings 38 of sprocket 32. Fingers 74 are in frictional contact with a drag ring 76. Drag ring 76 defines a pair of spaced projections 78 and 80 for engagement by a finger 74 such that drag ring 76 is rotated with fingers 74 as roller cage 68 rotates. A wear ring 82 is press fit to housing section 20 for frictional contact by drag ring 76, so as to establish smooth frictional engagement with housing section 20. As a result, balanced radial forces are developed which cause a relative drag effect on roller cage 68 for a purpose to be disclosed.

A direction sensitive blocking mechanism, best shown in FIGS. 4 and 6, includes a pin 84 secured to flange 36 of sprocket 32, and a rocker element 86 pivotally supported by pin 84. Element 86 includes a pair of arms 88 and 90 and a projection 92. A drag ring 94 engages projection 92 and is in frictional contact with wear ring 82, so as to establish smooth frictional engagement with housing section 20. Drag ring 94 is spaced from fingers 74 of roller cage 68.

A drive-back mechanism includes a Belleville spring 96 interposed between flange 42 of sprocket assembly 32 and extension 60 of clutch 72. Belleville spring 96 applies an axially directed biasing force to extension 60. As extension 60 is engaged with output shaft 54 by means of connection 58, the biasing force of Belleville spring 96 tends to move extension 60 axially relative to output shaft 54 (to the right as shown in FIGS. 2 and 4). An annular friction pad 98 is interposed between extension 60 and flange 36 of sprocket assembly 32. The biasing force of Belleville spring 96 tends to urge extension 60 into contact with friction pad 98, which in turn is in contact with flange 36. This results in the establishment of a friction drive path between output shafts 52 and 54, which drive path is in parallel with the drive path established through clutch 72. The friction drive path is independent of the clutch drive path.

Torque is received by input shaft 50 and is transferred through the high-low gear assembly 51 and the chain drive train to drive output shaft 52. In one preferred form of the invention, output shaft 52 is connected through propeller shaft 4 to drive fixed rear axle assembly 5 and its associated wheels 6. Output shaft 54 is connected through propeller shaft 7 to drive steerable front axle assembly 8 and its associated wheels 9.

Heretofore it had been believed that output shaft 54 should rotate faster than output shaft 52 in order that outer race 62 overrun inner race 66. The prior art teaches that one way of accomplishing this is by providing front and rear axles having slightly different gear ratios. During vehicle operation, the frictional engagement of drag ring 76 with housing section 20 develops a relative drag effect on roller cage 68. This drag effect causes rollers 70, in effect, to rotate relatively toward a clutch engaging position. The prior art teaches that building in an overrun of extension 60 relative to cam 64 is necessary to prevent clutch engagement until such time as the rear wheels lose traction and output shaft 52 speeds up relative to output shaft 54. This would result in automatic engagement of clutch 72, shifting from the two-wheel drive mode to the four-wheel drive mode. When the rear wheels regain traction, output shaft 52 slows down relative to output shaft 54, and the overrun built into prior art systems would cause clutch 72 automatically to disengage, shifting from the four-wheel drive mode to the two-wheel drive mode.

It has now been determined that the system will operate efficiently when the front and rear axles have equal axle ratios, thus giving all of the advantages of a vehicle with equal axle ratios, including improved handling, better ability of the vehicle to climb grades, particularly on soft terrain, reduced problems associated with engine braking and improved fuel economy.

Equal axle ratios may be provided even where tires of equal size are used on all wheels. With belted tires, there is litte or no change in the rolling radius under varying conditions of load, pressure, speed and wear. The manufacturing tolerances used in the production of original equipment belted tires are such as to limit the size variations of the tires. As a result, even if a slight underrun of outer race 62 relative to inner race 66 is encountered due to size variations, such underrun would be in the order of approximately $\frac{1}{2}\%$ to $\frac{3}{4}\%$, which is tolerable.

If such an underrun condition exists, a positive tractive effort will appear at the front wheels. In other words, the front wheels will carry a positive propelling force and will tend to drag the rear wheels, thus tending to develop a negative tractive effort at the rear wheels. The permissible amount of underrun at the front wheels for all practical purposes is limited by values of the opposing driving and dragging forces generated at the ground contacts.

Where the tires are of such size that there is neither overrun nor underrun of outer race 62 relative to inner race 66, clutch 72 will effectively engage only when the rear wheels tend to overrun the front wheels. Otherwise, the clutch will effectively disengage and the vehicle will operate in the two-wheel drive mode.

Where the tires are such that overrun of outer race 62 is encountered, clutch 72 operates in the manner taught by the prior art.

It has been determined further that the conditions encountered with the use of belted tires are encountered also when using bias ply tires. Bias ply tires are manufactured to greater tolerances than belted tires, resulting in greater rolling radius differences. In addition, bias ply tires exhibit greater changes in rolling radius under varying conditions of load, pressure and speed. However, because of the high compliance characteristics of bias ply tires, their adhesion properties complement changes in the rolling radius. At low speeds, the adhesion of bias ply tires is forgiving of excessive slip. At high speeds, where the rear tires are overloaded and/or underinflated with consequent reduced rolling radius, they exhibit greater rolling radius increase than the normally loaded and inflated front tires, thus effectively reducing front underrun. Thus, it is apparent that the desirable operating characteristics associated with a vehicle having equal axle ratios may be obtained using either belted or bias ply tires.

In addition, equal axle ratios prevent the adverse effects encountered under conditions of excessive overrun. This becomes apparent where four-wheel drive is required, but output shaft 52 must speed up excessively before clutch 72 engages. High overrun would cause excessive slip of the rear wheels before the front wheels assume tractive effort. As a result, the rear wheels would lose tractive effort, and dig holes while driving on loose terrain.

Excessive overspeed of outer race 62 could pull cage 68 and rollers 70 beyond the freewheel position into a clutch engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc. could cause instantaneous excessive overspeed sufficient to pull the rollers beyond the freewheel position to create the same potential danger. Centrifugal force effects on the rollers tend to pull them, and the cage, toward the opposite side of the cam. While enough friction on the cage to prevent this could be built into the system, the amount required would be wasteful of power and could lead to excessive wear under normal operating conditions. The direction sensitive blocking mechanism prevents such inadvertent movement of rollers 70 at all speeds, and is disclosed in detail in U.S. application No. 637,923 filed Dec. 5, 1975.

The direction sensitive blocking mechanism is operable independently of speed. Initial vehicle movement causes rotation of sprocket 32 to drive output shaft 52 and cam 64. Pin 84, secured to flange 36 of sprocket 32, rotates therewith and with cam 64. Element 86 is carried with pin 84. Drag ring 94, engaged with projection 92 of element 86, tends to lag pin 84 due to its frictional contact with wear ring 82. As a result, element 86 is pivoted about pin 84, and either arm 88 or 90 is moved into the path of rotational displacement of fingers 74, depending on the direction of vehicle movement. In this position, fingers 74 have limited freedom of movement such that cage 68 and rollers 70 are movable between clutch engaging and disengaging positions, but are not movable beyond the freewheel position toward the opposite clutch engaging position.

The drive-back mechanism overcomes undesirable characteristics found under certain operating conditions of existing systems. When going downhill on loose terrain, such as gravel or the like, in low gear, there may be enough engine braking to overcome the friction between the tires and the ground surface. At such times, the rear wheels break away; that is, they lose rolling contact with the surface and go into a skid. The same thing could happen on a level road in the coast mode of operation on a slippery surface, such as ice or the like. On ice, it could happen in high gear. In other words, whenever there is developed greater engine braking than the rear wheels can absorb alone, they will skid with consequent loss of vehicle directional control. This result is more apparent in a vehicle with a manual transmission than in one with an automatic transmission having a fluid member. The problem may be solved by providing a drive path back from front to rear in order that the front wheels keep the rear wheels rolling in the coast mode of operation, so as to overcome any tendency of the rear wheels to skid.

Such a drive path is provided from output shaft 54 through flange 56, extension 60 and flange 36 to output shaft 52. Belleville spring 96 provides a biasing force tending to establish frictional engagement between extension 60 and flange 36 through friction pad 98. It is desirable to keep the amount of torque transferred back as low as possible so as not to introduce significant inefficiency into the system in the drive mode of operation. It has been found that 50-to-100-foot pounds are adequate to prevent rear-wheel skid in conventional four-wheel drive vehicles. However, it should be noted that this amount will vary depending on the type of vehicle under consideration.

It should be noted that the drive-back feature is required only when in the coast mode of operation. Should it be desirable to transfer higher amounts of torque back to the rear wheels, the resulting operating inefficiencies in the drive mode under normal driving conditions may be avoided by the provision of a one-way device such as, for example, a spring clutch in place of Belleville spring 96 and friction pad 98. FIG. 7 shows such an alternative arrangement wherein a spring clutch 100 is wrapped around extension 60. Spring clutch 100 has an upstanding end 102 received in an opening 104 defined by sprocket 32. Spring 100 is wound around extension 60 in a direction such that in the drive mode, spring 100 will tend to unwind, thereby minimizing the friction introduced into the system. In the coast mode, when the rear wheels break away they tend to slow down and the relative rotation between output shaft 52 and output shaft 54 is such that spring 100 tends to tighten around extension 60. This provides a drive path with a limited torque capacity sufficient to keep the rear wheels rotating.

The friction drive path, independent of and in parallel with the clutch drive path, may be incorporated in a four-wheel drive system of the type found in the prior art wherein overrun of outer race 62 relative to inner race 66 is built into the system. The drive-back function provided by the parallel friction drive path would be the same in either case.

It should be understood that while a preferred embodiment of the invention has been shown and described, this is illustrative and may be modified by those skilled in the art without departing from the scope thereof, which is to be limited only by the claims herein.

We claim:

1. Power transmission apparatus comprising first and second rotatable shaft means, said first shaft means including a first clutch race, an element loosely engaged with said second shaft means for rotation therewith and for axial movement relative thereto and relative to said first clutch race, said element defining a second clutch race, wedging means movable into and out of wedging engagement with said races, said wedging means establishing a first drive path between said shaft means when in said wedging engagement, and means establishing a second drive path between said shaft means, said last-mentioned means including friction means interposed between said first shaft means and said element, and means biasing said element axially into slipping contact with said friction means.

2. The invention of claim 1, said first clutch race being an inner race defining a plurality of cam surfaces, said element being concentric with and spaced outwardly from said inner race, said element defining an annular outer race, and said wedging means including an annular cage, and a plurality of rollers supported by said cage between said races for said movement into and out of said wedging engagement.

3. The invention of claim 1, said first shaft means including a shaft, and another element engaged for rotation with said shaft, said friction means being interposed between said element and said other element.

4. Power transmission apparatus comprising first and second rotatable shaft means, overrunning clutch means coupling said first and second shaft means for establishing a first drive path therebetween upon a tendency of said first shaft means to overrun said second shaft means, and spring means for establishing a slipping frictional coupling between said first and second shaft means constituting a second drive path of limited torque capacity therebetween only upon a tendency of said second shaft means to overrun said first shaft means, said spring means having one end thereof engaged with one of said shaft means for rotation therewith, said spring means being wound around the other of said shaft means so as to tighten upon said tendency of said second shaft means to overrun said first shaft means thereby establishing said second drive path, and so as to loosen upon said tendency of said first shaft means to overrun said second shaft means thereby disestablishing said second drive path.

* * * * *